United States Patent
Blake

(10) Patent No.: US 8,489,070 B1
(45) Date of Patent: Jul. 16, 2013

(54) SYSTEMS AND METHODS FOR CONSERVING NETWORK RESOURCES

(75) Inventor: Tony Blake, Chapel Hill, NC (US)

(73) Assignee: AT&T Mobility II LLC, Atlanta, GA (US)

( * ) Notice: Subject to any disclaimer, the term of this patent is extended or adjusted under 35 U.S.C. 154(b) by 840 days.

(21) Appl. No.: 12/138,861

(22) Filed: Jun. 13, 2008

(51) Int. Cl.
*H04M 11/00* (2006.01)
*H04M 15/00* (2006.01)

(52) U.S. Cl.
USPC .............................. 455/408; 455/405; 455/406

(58) Field of Classification Search
USPC .............. 455/406–408, 405; 379/114.01–141
See application file for complete search history.

(56) References Cited

U.S. PATENT DOCUMENTS

| 7,149,293 | B1* | 12/2006 | Coppage et al. | ........... 379/114.2 |
| 2006/0258331 | A1* | 11/2006 | Syrett et al. | ................... 455/405 |
| 2008/0039050 | A1* | 2/2008 | Black et al. | ................... 455/406 |

* cited by examiner

*Primary Examiner* — Lester Kincaid
*Assistant Examiner* — Daniel Lai
(74) *Attorney, Agent, or Firm* — Parks IP Law LLC; Mickki D. Murray, Esq.

(57) ABSTRACT

An account management engine for managing at least one prepaid wireless service account can include a calculation logic module that includes at least one scheduling algorithm configured to calculate a message delay time, the expiration of which triggers a continue message to be sent to a service switching point (SSP) instructing the SSP to continue an established call. A method for managing at least one prepaid service account can include calculating, based upon at least one scheduling algorithm, a message delay time, the expiration of which triggers a continue message to be sent to a service switching point (SSP) instructing the SSP to continue an established call.

20 Claims, 4 Drawing Sheets

SYSTEMS AND METHODS FOR CONSERVING NETWORK RESOURCES

TECHNICAL FIELD

The present disclosure relates generally to telecommunications services. More particularly, the present disclosure relates to systems and methods for conserving network resources.

BACKGROUND

Many wireless service providers offer wireless communication services, such as wireless voice service and wireless data service via prepaid and postpaid service plans. Prepaid wireless services are popular among customers who are ineligible for a postpaid service plan, such as customers with no or poor credit history and customers that do not want the obligation of a recurring bill. Prepaid customers can purchase voice minutes, data throughput, and text messages at a set price via a variety of methods, such as prepaid cards, Internet transactions, telephone transactions, point-of-sale transactions, and in-call transactions, for example. The prepaid customer can use the service until the purchase minutes, data throughput, and/or messages are depleted, at which point the prepaid customer can replenish the account to continue using the service.

Postpaid accounts are designed such that if the customer exceeds the number of voice minutes, data capacity, text messages, or other services, the postpaid customer will be charged for the excess services on a bill sent to the customer at the end of the billing cycle. Often times, the customer is unaware of the overage and is requested to pay an unexpected bill at the end of the billing cycle. Services, such as AT&T's ROLLOVER® service aim to eliminate overages and accumulate unused minutes for use in future billing cycles.

Prepaid wireless networks face the unique requirement of having to update prepaid accounts to reflect any service rendered in real-time or near real-time. Methods have been developed to send messages to the serving mobile switching center (MSC) instructing the MSC to continue an established call every two minutes. A prepaid account balance is decremented each time a message is sent. The message is sent without regard to the number of minutes available in the prepaid account, therefore all prepaid accounts will be updated via this method.

SUMMARY

According to one embodiment of the present disclosure, an account management engine for managing at least one prepaid wireless service account can include a calculation logic module that includes at least one scheduling algorithm configured to calculate a message delay time. The expiration of the message delay time can trigger a continue message to be sent to a service switching point (SSP) instructing the SSP to continue an established call.

In some embodiments the account management engine can further include an account balance database configured to store at least one account balance associated with at least one prepaid wireless service account. The account balance database can be further configured to update the at least one account balance in response to the continue message being sent.

In other embodiments the account management engine can further include a rule database configured to store at least one rule used by the at least one scheduling algorithm to calculate the message delay time. The at least one rule can include at least one threshold account balance used to trigger the calculation of a new message delay time. The at least one threshold account balance can also trigger a warning tone. The at least one threshold account balance can also trigger a replenish request. The threshold account balance can be a percentage of an account balance, a monetary value, a temporal value, or a data throughput value, for example.

According to another embodiment of the present disclosure, a method for managing at least one prepaid service account can include establishing a communication session between a mobile device and a second device. The method can further include monitoring an account balance of a prepaid service account associated with the mobile device to determine if a threshold account balance has been reached. If a threshold account balance has been reached, the method can proceed by continuing to monitor the account balance of the prepaid service account. If a threshold account balance has not been reached, the method can proceed by calculating a message delay time and sending a continue message to an SSP according to the message delay time, and maintaining the communication session until the account balance is depleted. In some embodiments the second device is a wireline device and in other embodiments the second device is a second mobile device. The threshold account balance can be a percentage of the account balance, a monetary value, a minute value, or a data throughput, for example.

According to yet another embodiment of the present disclosure, a method for managing at least one prepaid service account can include calculating a message delay time based upon at least one scheduling algorithm. The expiration of the message delay time can trigger a continue message to be sent to an SSP instructing the SSP to continue an established call.

In some embodiments the method can further include updating, in response to the continue message being sent, at least one account balance that is associated with at least one prepaid wireless service account for which the call was established. The calculating step can be based upon at least one rule used by the at least one scheduling algorithm to calculate the message delay time. The at least one rule can include at least one threshold account balance used to trigger the calculation of a new message delay time. The at least one threshold account balance can also trigger a warning tone or a replenish request. The threshold account balance can be a percentage of an account balance, a monetary value, a minute value, or a data throughput value, for example.

DETAILED DESCRIPTION

As required, detailed embodiments of the present disclosure are disclosed herein. It must be understood that the disclosed embodiments are merely exemplary examples of the disclosure that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

Figure 1:
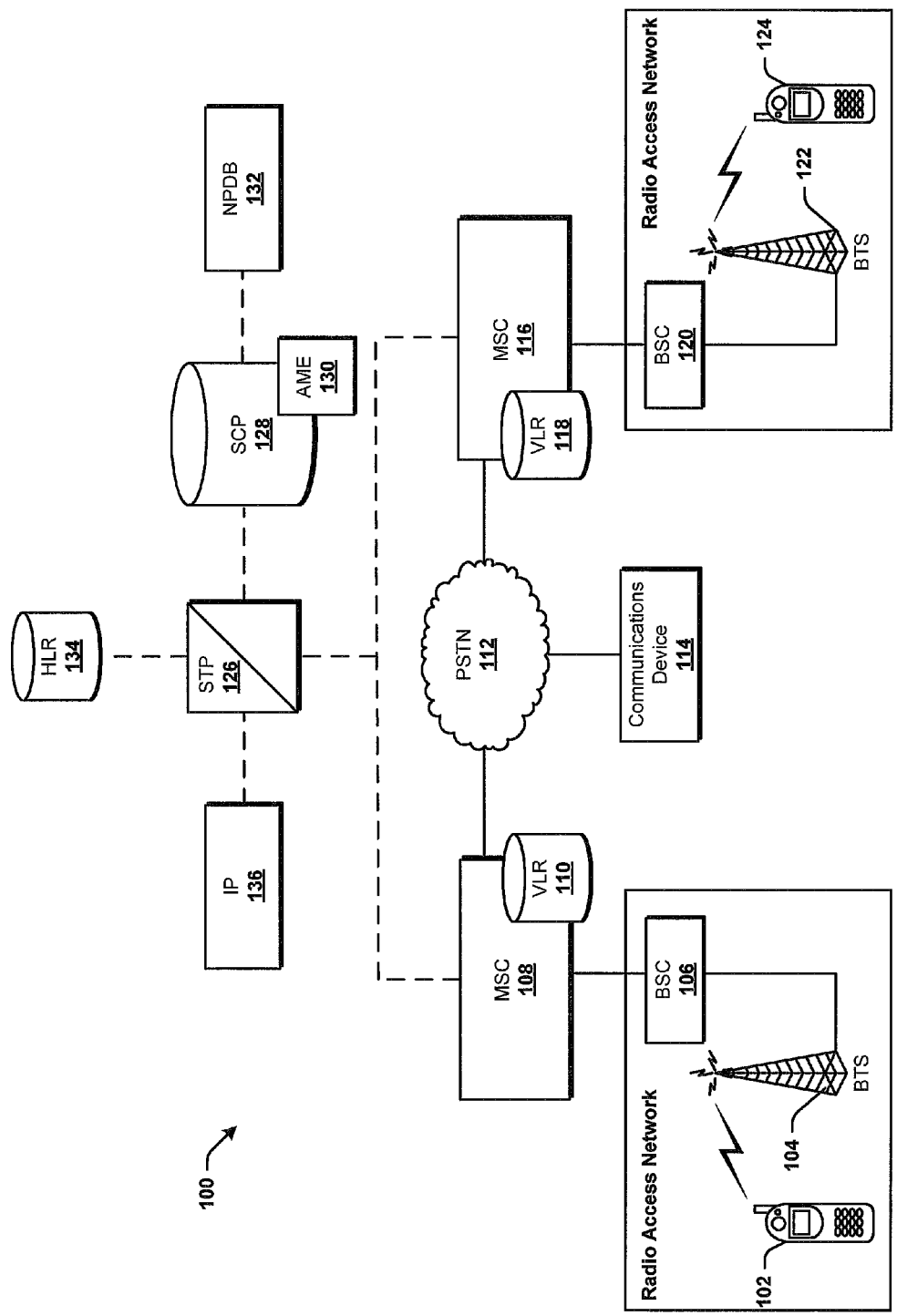
FIG. 1 schematically illustrates a portion of an exemplary communications network in which some aspects of the present disclosure can be practiced.

Referring now to the drawings wherein like numerals represent like elements throughout the drawings, FIG. 1 illustrates a portion of an exemplary communications network 100, according to the present disclosure. The communications network 100 can include wireless intelligent network (WIN) elements for facilitating intelligent network features and services including, but not limited to, a novel feature implemented in accordance with the present disclosure to conserve network resources for wireless prepaid services by reducing messages sent to maintain an established communication session.

The communications network 100 can be configured as a 2G GSM (Global System for Mobile communications) network and can provide data communications via GPRS (General Packet Radio Service), and EDGE (Enhanced Data rates for GSM Evolution). The communications network 100 can be configured as a 3G UMTS (Universal Mobile Telecommunications System) network and provide data communications via the HSPA (High-Speed Packet Access) protocol family, such as, HSDPA (High-Speed Downlink Packet Access), EUL (Enhanced Uplink) or otherwise termed HSUPA (High-Speed Uplink Packet Access), and HSPA+(Evolved HSPA). The communications network 100 is also compatible with future mobile communications standards including, but not limited to, pre-4G and 4G, for example. Other technologies, such as, FDMA (Frequency Division Multiple Access), TDMA (Time Division Multiple Access), CDMA (Code Division Multiple Access), and the like are contemplated. The wireless communications network 100 can be configured to provide messaging services via SMS (Short Message Service), MMS (Multimedia Message Service), instant messaging, and USSD (Unstructured Supplementary Service Data, for example. The communications network 100 is described below with reference to GSM terminology, however, in alternative implementations, the network components can be configured in accordance with specifications of other technologies.

The illustrated communications network 100 has been simplified so as not to obscure the features of the present disclosure. Well-known components, systems, and/or methods have not been described in detail in order to avoid obscuring the present disclosure. Additionally, some elements have been purposefully withheld from the illustrated communications network 100 and the description thereof for the sake of brevity and clarity of the disclosure. Other elements are illustrated as single elements that can be representative of a plurality of like elements.

It should be understood that features of the present disclosure can be implemented in a network operated by one service provider or implemented among one or more networks operated by one or more service providers. Further, features of the present disclosure are often described as being implemented to conserve network resources for pre-paid voice services. These features, however, can also be implemented to conserve network resources for pre-paid data services or for other purposes. By way of example and to further contextualize the terms used in the following description, a pre-paid service can use an account balance to serve as an actual or suggested limit on use of voice or data services. An account balance can represent a time limit, such as time of use (e.g., seconds, minutes, hours, days, etc.), a monetary limit, such as dollars of use, or data throughput, such as bytes of use, for example. The account balance can be established by prepayment or can be representative of an assigned limit on use, which the user may or may not be allowed to exceed.

The illustrated communications network 100 includes a first mobile device 102 (hereinafter MD A 102) that is illustrated as being in communication via an air interface with a base transceiver station (BTS) 104 that, in turn, is illustrated as being in communication with a base station controller (BSC) 106 via a communication link. MD A 102 can be a mobile terminal, a user equipment, a computer, a handheld computer, a PDA, a smart phone, or other device capable of communication via a cellular technology, such as one or more of the technologies described above, for example. Collectively, MD A 102, the BTS 104, and the BSC 106 form a portion of a radio access network (RAN).

The BSC 106 is illustrated as being in communication with a mobile switching center (MSC) 108 that serves to connect calls between various points within the communications network 100. The MSC 108 operates as the service switching point (SSP) in the WIN and can perform a service switching function (SWF) in the WIN. The MSC 108 can include a visiting location register (VLR) 110. The VLR 110 can include all subscriber data required for call handling and mobility management for mobile subscribers currently located in the area controller by the VLR 110. The MSC 108 is illustrated as being in communication with the public switched telephone network (PSTN) 112 via a communications link. The PSTN 112 can include a path to landline devices, such as a communications device 114 that can be a landline telephone, for example. The PSTN 112 can also connect to the Internet (not shown), which can provide packet-based communication, such as VoIP via a VoIP device. The PSTN 112 can provide a path for communication between the MSC 108 and another MSC 116. The MSC 116, like MSC 108, can include a VLR 118. The MSC 116 is interconnected via a BSC 120 and a BTS 122 to a second mobile device 124 (hereinafter MD B 124).

The illustrated communications network 100 includes a signaling subsystem that can be a signaling system number 7 (SS7) signaling subsystem, for example. The core of the signaling subsystem can be a signal transfer point (STP) backbone network 126, illustrated as a single STP. The STP backbone network 126 can include one or more STPs and associated signaling links. The STP backbone network 126 carries out-of-band signals that are used to setup and tear down communication sessions between MD A 102, MD B 124, and/or another communications device, such as the communications device 114 or a packet-based communication device (not shown). The MSCs 108, 116 are each in communication with the STP backbone network 126 via signaling links.

The illustrated STP backbone network 126 is in communication with a centralized service control point (SCP) 128 via a signaling link. The SCP 128 can perform service control functions (SCF) in the WIN. The SCP 128 can provide service control and service data functions, provide mechanisms for introducing new services and customizing existing services and features, and perform subscriber or application specific service logic in response to a query from an MSC 108, 116 (SSP) and reply with instructions to perform specified functions and how to continue or terminate call processing. The illustrated SCP 128 includes an account management engine (AME) 130 in accordance with an embodiment of the present disclosure. The AME 130 can additionally or alternatively be in communication with the SCP 128 or other network elements.

The AME 130 can be configured to calculate a message delay time. The message delay time can specify a time period, the expiration of which triggers the AME 130 to send a continue message to the serving MSC 108, 116 to continue a call. The message time delay can be calculated for one or more prepaid accounts associated with one or more subscribers. The prepaid accounts can be associated with a voice service or a data service, for example. The AME 130 is described below in detail with reference to FIG. 2.

The illustrated SCP 128 is in communication with a number portability database (NPDB) 132. The NPDB 132 can facilitate the scenario whereby a subscriber may retain their telephone number when moving to another location or to another carrier or operator. The NPDB 132 can return a routing number to the AME 130 to identify a called subscriber's subscription network for scenarios in which a calling subscriber roams in the home public land mobile network (HPLMN) and the called subscriber's MSISDN indicates that the called subscriber subscribes to a PLMN within the calling subscriber's home country.

The illustrated STP backbone network 126 is in communication with a home location register (HLR) 134 via a signaling link. The HLR 134 serves standard functions in the wireless network including providing routing information and maintaining subscription information. The HLR 134 can be located in the SCP 128.

The illustrated STP backbone network 126 is also in communication with an intelligent peripheral (IP) 136 via a signaling path. The IP 136 can be configured to perform specialized resource functions (SRF), such as, playing warning tones, playing announcements, collecting digits, providing speech recognition functions, and recording and storing voice messages, for example. The IP 136 can be configured to send a warning tone to a prepaid subscriber's mobile device to warn the subscriber that a threshold account balance is near, has been reached, and/or has been exceeded. A warning tone can be enabled/disabled based upon settings or preferences of the service provider and/or the prepaid subscriber. The IP 136 can further facilitate options to replenish a subscriber's prepaid account.

Figure 2:
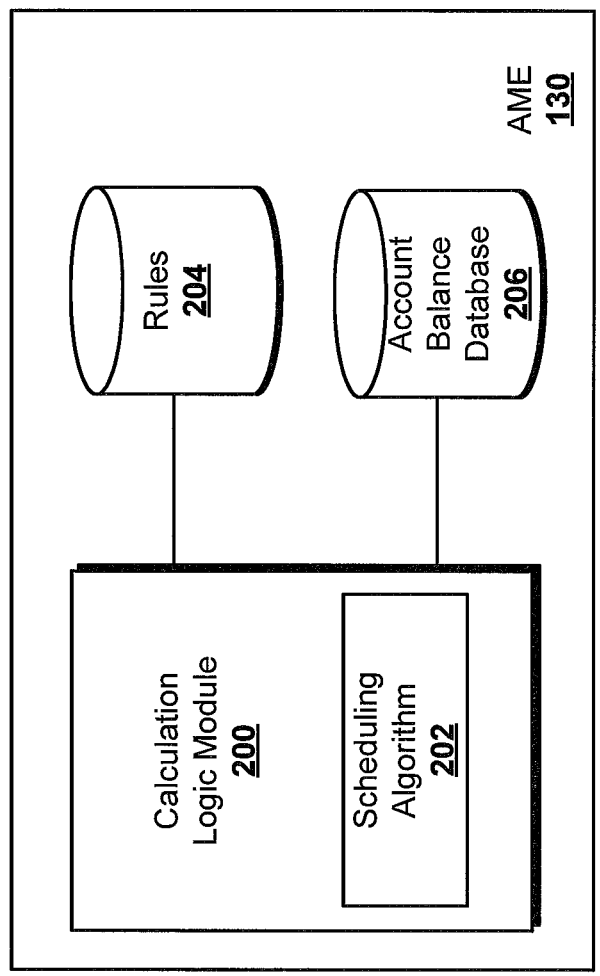
FIG. 2 schematically illustrates an exemplary account management engine and components thereof for use in accordance with an embodiment of the present disclosure.

Referring now to FIG. 2, an AME 130 and components thereof are illustrated, according to an exemplary embodiment of the present disclosure. The illustrated AME 130 includes a calculation logic module 200. The calculation logic module 200 can include at least one processor and at least one computer-readable memory, wherein the at least one computer-readable memory is configured to store one or more computer-implemented scheduling algorithms 202 and the at least one processor is configured to execute the one or more computer-implemented scheduling algorithms. In some embodiments the at least one processor and/or the at least one computer-readable memory can be configured remote to the AME 130.

The illustrated AME 130 further includes a rules database 204 and an account balance database 206 that can be stored in a computer-readable memory of the calculation logic module 200 or another computer-readable memory of the AME 130. The rules database 204 can store at least one rule that can be used by the scheduling algorithm 202 to determine a message delay time for a prepaid account. Rules can be applied to all prepaid accounts, a group of prepaid accounts, or individual prepaid accounts. The rules database 204, the account balance database 206, and/or the scheduling algorithm 202 can include a list or other indication of the rules to be applied to a particular prepaid account, group of prepaid accounts, or all prepaid accounts, for example.

The account balance database 206 can maintain account balances for one or more prepaid service accounts associated with one or more subscribers. An account balance can be updated at an interval specified by the message delay time. For example, if the calculation logic module 200 calculates a message delay time of thirty minutes, the AME 130 can generate and send a continue message to the serving MSC 108, 116 every thirty minutes. The message can instruct the serving MSC 108, 116 to continue the call.

Embodiments of the present disclosure are described with particular reference to the Transactions Capability Part (TCAP) of the Signaling System Number 7 (SS7) protocol suite and Customized Applications for Mobile network Enhanced Logic (CAMEL). Other protocols can be used to implement the methods described herein including, but not limited to, Transfer Control Protocol/Internet Protocol (TCP/IP), Bearer Independent Call Control (BICC), Session Initiation Protocol (SIP), Media Gateway Control Protocol (MGCP), H.323, variations, evolutions, and/or improvements thereof, and other like protocols and technologies, for example.

In current implementations used by many service providers, a continue message is sent every two minutes to maintain a call regardless of the number of minutes available in an account. By way of example, this two minute message delay time is referred to below as the typical message delay time. A warning tone is also typically applied when the account balance fails below one minute and the call is disconnected when the account balance is depleted.

The scheduling algorithm 202 can be used to determine the schedule by which continue messages are to be sent to the serving MSC 108, 116 based upon the number of minutes remaining in an account balance. That is to say, the scheduling algorithm 202 determines when to send a continue message and how long to allow a call to continue before sending a subsequent continue message.

The scheduling algorithm 202 can be a static algorithm that applies to all prepaid account balances based upon at least one static rule. Alternatively, the scheduling algorithm 202 can be a dynamic algorithm that is designed to determine a message schedule based upon at least one rule. In the latter example, the scheduling algorithm 202 can include one or more rules that apply to all account balances, wherein each account balance can also include one or more additional rules. For example, a rule can be established to prevent the message delay time from being set to two minutes or any shorter time. This is merely an example and the typical message delay time for other implementations may be greater or less than two minutes. If any calculation of algorithm 202 results in a message time delay that is a typical delay time or less, the algorithm 202 can continue in accordance with the previous messaging schedule and no changes will be made. A warning tone can be sent at any time and/or a replenish request can be sent at any time per the service provider's specifications, for example.

By way of example and not limitation, the scheduling algorithm 202 can determine if an account balance is sufficient to continue a call for a percentage of the account balance and can determine a message delay time based upon a percentage set in the rules database 204 for the prepaid account.

Further, an account balance range can be defined in the rules database 204 for when a specific percentage is to be applied. For example, the scheduling algorithm 202 can use one percent of the account balance when the account balance is greater than or equal to one hundred minutes. When the account balance decreases to one hundred minutes or less, the rule can change to ten percent of the account balance and the message delay time can be calculated accordingly. The account balance range can define at least one threshold account balance that, when reached or exceeded, triggers the scheduling algorithm to calculate a new message delay time based upon the percentage.

By way of another example and not limitation, the scheduling algorithm 202 can calculate a best case scenario according to any rules applied by the service provider. The service provider can establish a rule to maximize the number of saved messages over the typical message delay time. Alternatively, the service provider can establish a rule to reach a goal number of saved messages. As another alternative, the service provider can establish a rule to save a minimum number of messages. A service provider can establish any rule or number of rules to achieve what the service provider considers to be the best case scenario. The number of saved messages can be calculated by using the calculated message delay time divided by the typical message delay time. For example, assuming a typical message delay time of two minutes and a calculated message delay time of thirty minutes, the number of saved messaged equals fifteen messages.

Generally, the scheduling algorithm 202 can be configured in accordance with any specifications set forth by a wireless service provider, or possibly a third party, to conserve network resources by reducing total messages sent to update a prepaid account.

Figure 3:
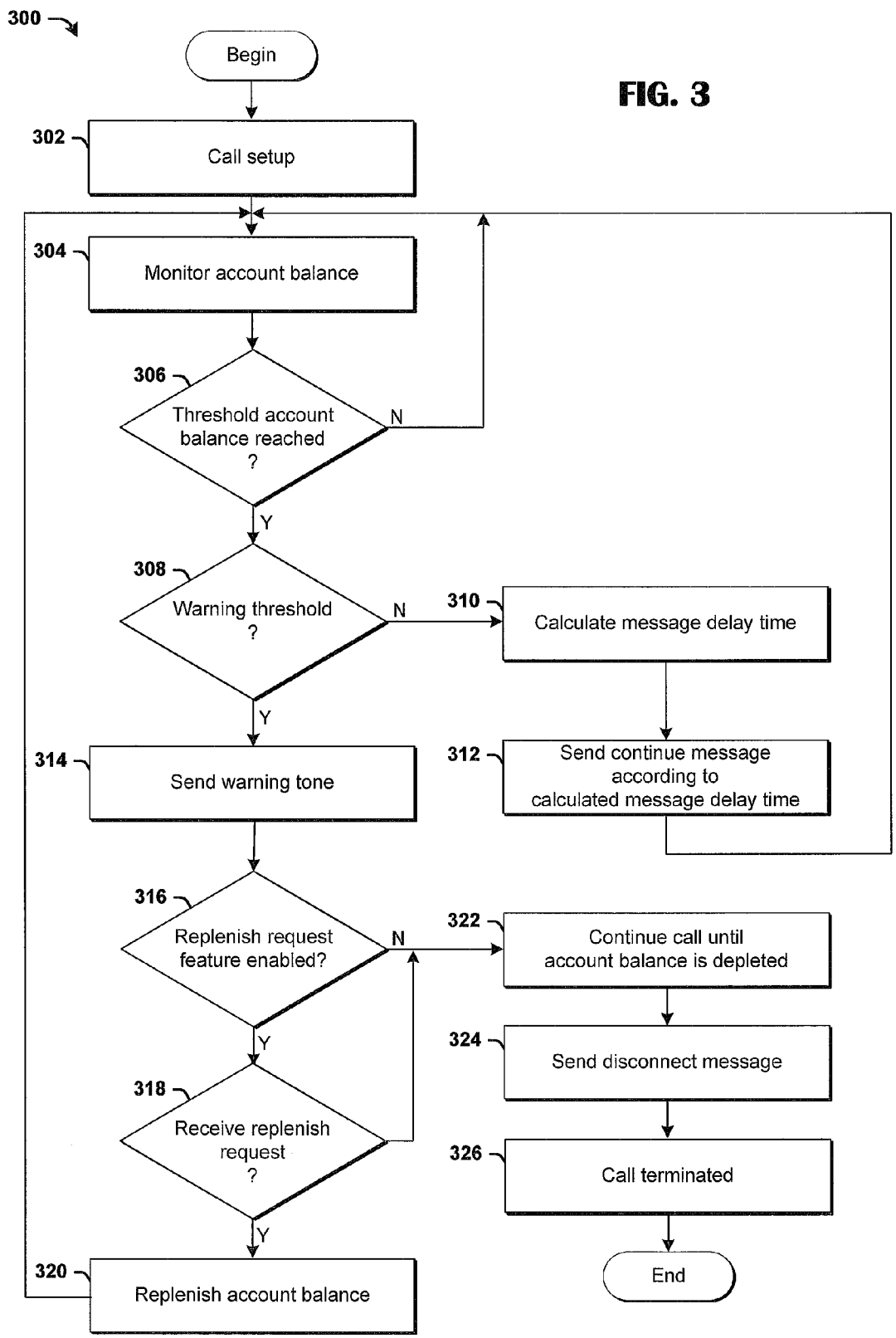
FIG. 3 schematically illustrates a method for managing a prepaid account, according to an exemplary embodiment the present disclosure.

Referring now to FIG. 3, a method 300 for managing a prepaid account is illustrated, according to an exemplary embodiment of the present disclosure. It should be understood that the steps of the process 300 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated process 300 can be ended at any time. Some or all steps of this process, and/or substantially equivalent steps, can be performed by execution of computer-readable instructions stored on a computer-readable memory in the form of a scheduling algorithm 202, for example.

The method 300 begins and flow proceeds to block 302 wherein a call is established between two devices, at least one of which is a mobile device, for example, MD A 102 or MD B 124. The method 300 is described with reference to a call established between MD A 102 and MD B 124. By way of example, a prepaid subscriber can originate a call from MD A 102 by sending dialed digits to the MSC 108. The MSC 108 can receive the dialed digits and request instructions from the SCP 128 by sending a call setup request to the SCP 128 including the dialed digits and an identifier of MD A 102. The AME 130 can identify the prepaid subscriber's account based upon the identifier. The identifier can be an account number, a MSISDN, an IMSI, or other identifier capable of being linked to a prepaid account. The AME 130 can retrieve the initial account balance and flow can proceed to block 304, wherein the account balance is monitored in accordance with the scheduling algorithm 202 and rules 204 assigned for the prepaid account associated with MD A 102. The account balance can be monitored such that if an account balance threshold is reached or exceeded the scheduling algorithm 202 calculates a new message delay time. If a threshold account balance is not reached or exceeded, as determined in block 306, the method 300 can return to block 304, wherein the account balance is monitored. If a threshold account balance is reached or exceeded, the flow can proceed to block 308 as explained immediately below.

At block 308, the scheduling algorithm 202 can be used to determine if the threshold is a warning threshold. A warning threshold is a threshold account balance that can trigger the sending of a warning tone to MD A 102. If it is determined that the threshold is not a warning threshold, flow proceeds to block 310, wherein the scheduling algorithm 202 can calculate a new message delay time based upon the rules 204 assigned for the account. A continue message can be generated and sent to the serving MSC 108 according to the calculated message delay time, as illustrated in block 312. The method 300 can return to block 304, wherein the account balance is monitored and continue messages are sent according to the calculated message delay time until another threshold account balance is reached, as determined at block 306.

If it is determined, at block 308, that the threshold is a warning threshold, flow proceeds to block 314, wherein a warning tone is sent to MD A 102. The SCP 128 can instruct the IP 136 to generate and send the warning tone to MD A 102, for example. At block 316, it is determined if a replenish request feature is enabled for the prepaid account. A replenish request feature can function to provide the subscriber with an option to replenish a prepaid account with funds to continue a call and can be facilitated by the IP 136, for example.

If a replenish request feature is enabled for the prepaid account, flow can proceed to block 318, wherein it is determined if a replenish request is received. If a replenish request is received, flow can proceed to block 320, wherein the account balance can be replenished according to the replenish request. For example, the subscriber can add any number of minutes, data throughput, or monetary value to the prepaid account.

If a replenish request feature is not enabled, or if a replenish request feature is enabled but no replenish request is received, flow can proceed to block 322, wherein the call can continue until the account balance is depleted. Additional warning tones can be sent to MD A 102. At block 324, a disconnect message can be sent to the MSC 108 and the call can be terminated at block 326. The method 300 can end.

Figure 4:
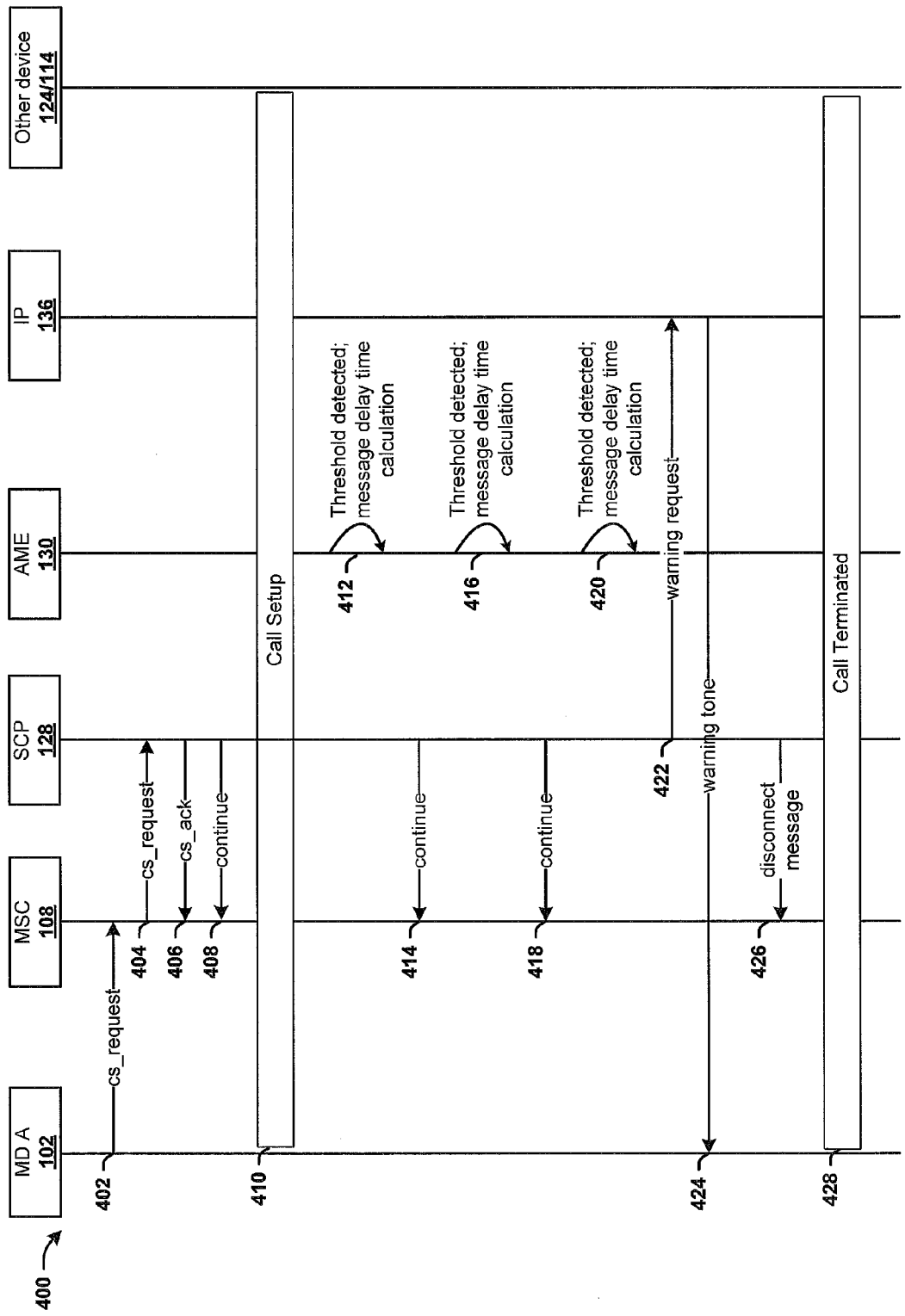
FIG. 4 is a message flow diagram illustrating a method for managing a prepaid account, according to an exemplary embodiment of the present disclosure.

Referring now to FIG. 4, a message flow diagram illustrating a method 400 for managing a prepaid account is illustrated, according to an exemplary embodiment of the present disclosure. It should be understood that the steps of the process 400 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated process 400 can be ended at any time. Some or all steps of this process, and/or substantially equivalent steps, can be performed by execution of computer-readable instructions stored on a computer-readable memory, for example, scheduling algorithm 202.

The method 400 is described with particular reference to a scheduling algorithm 202 that employs three account balance thresholds, the last of which is a warning threshold. As described above, the scheduling algorithm 202 can be updated dynamically for each account, therefore, the method 400 can be modified with more or less account balance thresholds and may include more or less warning thresholds, replenish requests, or other message delay time calculation than those illustrated.

As explained briefly above, the present disclosure can utilize various protocols including, but not limited to, TCAP, CAMEL, TCP/IP, BICC, SIP, MGCP, H.323, variations or improvements thereof, and other applicable protocols or technologies, for example. The call control messages are described below in generic terms, however, for purposes of explanation and not limitation, it is noted that the continue message, for example, can be a CAMEL application part (CAP) continue (CUE) message and the other messages can be part of the CAP protocol.

The method 400 can begin and MD A 102 can send a call setup request (cs_request) to the MSC 108 (step 402). The MSC 108 can receive the cs_request and forward the cs_request to the SCP 128 (step 404). The SCP 128 can acknowledge the cs_request with an acknowledge message (cs_ack) (step 406) and can follow-up with a continue message (step 408) assuming the subscriber's prepaid account has sufficient minutes to setup the call. The call can be setup (step 410).

The call can continue and continue messages can be sent periodically in accordance with the established message delay time until a threshold account balance is detected and a new message delay time is calculated (step 412). A subsequent continue message can be sent (step 414) in accordance with the new message delay time until the next threshold account balance is detected and another new message delay time is calculated (step 416). Another subsequent continue message can be sent (step 418) in accordance with the new message delay time until the next threshold account balance is detected and another new message delay time is calculated (step 420). Steps 412-420 can be reiterated any number of times. For purposes of illustration, the threshold account balance in step 420 is illustrated as a warning threshold account balance. Accordingly, the SCP 128 can send a warning request (step 422) to the IP 136. In response, the IP 136 can send a warning tone to the MD A 102 (step 424) to notify the subscriber that the subscriber's account balance is low, for example. The account balance can be updated until the account balance is depleted at which point the SCP 128 can send a disconnect message (step 426) to a network element, for example, the MSC 108, and the call can be terminated (step 428).

The aforementioned embodiments are described with respect to the reduction of messages on links carrying charging messages for prepaid wireless services. Aspects of the present disclosure, however, can be applied to voice calls, data, text messaging, multimedia messaging, video messaging, and other telecommunications services offered by wireless, wireline, and/or converged wireless/wireline service providers. Further, the present disclosure can be applied to the reduction of any other messages types, or for other purposes, for example, power reduction, incentive programs, device-to-device communications involved in debit or credit transactions, such as parking meters, toll roads/bridges, and vending machines, and other purposes.

It should also be understood that the present disclosure is not limited to certain protocols and can be implemented using a variety of protocols including those described herein, improvements, evolutions, or variations thereof, and the like, for example.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. An account management engine, for managing a prepaid service account, comprising:
   a processor; and
   a memory having computer-executable instructions that, when executed by the processor, cause the processor to perform operations comprising:
      calculating a message delay time for a schedule according to which continue-communication messages are transmitted to a communications-network node for authorizing continuation of an established communication involving the prepaid service account; wherein calculating the message delay time comprises:
         calculating, by the processor, the message delay time according to a rule related to (i) a balance of the prepaid service account and (ii) a threshold account balance used to trigger calculation of the message delay time; and
         calculating, by the processor, the message delay time, according to the rule, in response to a determination that the balance of the prepaid service account has a predetermined relationship to the threshold account balance, wherein the processor calculates the delay time only when triggered by the determination that the balance of the prepaid service account has the predetermined relationship to the threshold account balance.

2. The account management engine of claim 1, wherein the computer-executable instructions, when executed by the processor, cause the processor to perform the operations further comprising causing, in response to a continue-communication message being sent, an account balance database to update the prepaid service account balance stored at the database.

3. The account management engine of claim 1, wherein the threshold account balance is a predetermined percentage of the balance of the prepaid service account.

4. The account management engine of claim 1, wherein the rule prevents the processor from putting into effect any message delay time calculated to be below a predetermined value.

5. The account management engine of claim 4, wherein the rule causes the processor to, in response to a determination that a calculation would result in a new message delay time being below the predetermined value, determine not to put the new message delay time into effect.

6. The account management engine of claim 1, wherein the rule causes the processor to calculate the message delay time using a percentage of the balance of the prepaid service account.

7. The account management engine of claim 1, wherein the rule describes:
   an account balance range;
   a first percentage for use to calculate the message delay time when the balance of the prepaid service account is within the account balance range; and
   a second percentage for use to calculate the message delay time when the balance of prepaid service account is outside of the account balance range.

8. The account management engine of claim 1, wherein the rule describes:

a first percentage for use to calculate the message delay time when the balance of the prepaid service account is greater than or equal to a particular value; and a second percentage for use to calculate the message delay time when the balance of the prepaid service account is below the particular value.

9. The account management engine of claim 8, wherein:
the particular value is a first particular value; and
the rule describes a third percentage for use, to calculate the message delay time when the balance of the prepaid service account is greater than or equal to a second particular value.

10. The account management engine of claim 1, wherein the balance of the prepaid service account has the predetermined relationship to the threshold balance when the balance of the prepaid service account is less than the threshold balance.

11. A method, for managing a prepaid service account, comprising:
calculating, by a calculation logic module having a processor, a message delay time for a schedule according to which continue-communication messages are transmitted to a communications-network node for authorizing continuation of an established communication involving the prepaid service account;
wherein calculating the message delay time includes calculating the message delay time according to a rule related to (i) a balance of the prepaid service account and (ii) a threshold account balance used to trigger calculation of the message delay time; and
wherein calculating the message delay time is triggered, according to the rule, in response to a determination that the balance of the prepaid service account has a predetermined relationship to the threshold account balance, and the calculation logic module calculates the message delay time only when triggered by the determination that the balance of the prepaid service account has the predetermined relationship to the threshold account balance.

12. The method of claim 11, wherein the threshold account balance is a predetermined percentage of the balance of the prepaid service account.

13. The method of claim 11, wherein the rule prevents the calculation logic module from putting into effect any message delay time calculated to be below a predetermined value.

14. The method of claim 11, wherein the rule causes the calculation logic module to calculate the message delay time using a percentage of the balance of the prepaid service account.

15. The method of claim 11, wherein the rule describes:
an account balance range;
a first percentage for use by the calculation logic module, to calculate the message delay time, when the balance of the prepaid service account is within the account balance range; and
a second percentage for use by the calculation logic module, to calculate the message delay time, when the balance of prepaid service account is outside of the account balance range.

16. The method of claim 11, wherein the rule describes:
a first percentage for use by the calculation logic module, to calculate the message delay time, when the balance of the prepaid service account is greater than or equal to a particular value; and
a second percentage for use by the calculation logic module, to calculate the message delay time, when the balance of the prepaid service account is below the particular value.

17. The method of claim 11, wherein the balance of the prepaid service account has the predetermined relationship to the threshold balance when the balance of the prepaid service account is less than the threshold balance.

18. A computer-readable storage device comprising computer-executable instructions that, when executed by a processor, cause the processor to perform operations, for managing a prepaid service account, comprising:
calculating a message delay time for a schedule according to which continue-communication messages are transmitted to a communications-network node for authorizing continuation of an established communication involving the prepaid service account;
wherein calculating the message delay time includes calculating the message delay time according to a rule related to (i) a balance of the prepaid service account and (ii) a threshold account balance used to trigger the calculation of the message delay time; and
wherein calculating the message delay time is triggered, according to the rule, in response to a determination that the balance of the prepaid service account has a predetermined relationship to the threshold account balance, and the processor calculates the message delay time only when triggered by the determination that the balance of the prepaid service account has the predetermined relationship to the threshold account balance.

19. The computer-readable storage device of claim 18, wherein the threshold account balance is a predetermined percentage of the balance of the prepaid service account.

20. The computer-readable storage device of claim 18, wherein the balance of the prepaid service account has the predetermined relationship to the threshold balance when the balance of the prepaid service account is less than the threshold balance.

* * * * *